United States Patent [19]

Maassen et al.

[11] Patent Number: 4,899,996
[45] Date of Patent: Feb. 13, 1990

[54] HYDRAULICALLY DAMPING ELASTIC BEARING

[75] Inventors: Jürgen Maassen, Erftstadt; Klaus Hafner, Kretzhaus, both of Fed. Rep. of Germany

[73] Assignee: Boge AG, Eitorf, Fed. Rep. of Germany

[21] Appl. No.: 214,660

[22] Filed: Jul. 1, 1988

[30] Foreign Application Priority Data

Jul. 2, 1987 [DE] Fed. Rep. of Germany ....... 3721866

[51] Int. Cl.⁴ .......................... F16F 13/00; B60K 5/12
[52] U.S. Cl. .................................. 267/140.1; 267/219
[58] Field of Search ....................... 267/140.1, 35, 219;
180/312; 248/636, 550, 562, 566; 280/707

[56] References Cited

U.S. PATENT DOCUMENTS

| | | | |
|---|---|---|---|
| 4,277,056 | 7/1981 | Ticks | 267/140.1 |
| 4,568,069 | 2/1986 | Poupard | 267/140.1 |
| 4,573,656 | 3/1986 | Yoshida et al. | 267/140.1 |
| 4,648,576 | 3/1987 | Matsui | 267/140.1 |
| 4,676,489 | 6/1987 | Hofmann et al. | 267/140.1 |
| 4,699,348 | 10/1987 | Freudenberg | 267/140.1 |
| 4,709,779 | 12/1987 | Takehara | 267/140.1 |
| 4,733,758 | 3/1988 | Duclos et al. | 267/140.1 |
| 4,783,062 | 11/1988 | Hamberg et al. | 267/140.1 |

FOREIGN PATENT DOCUMENTS

| | | |
|---|---|---|
| 3316025 | 11/1984 | Fed. Rep. of Germany . |
| 3431117 | 8/1984 | Fed. Rep. of Germany . |
| 3619686 | 12/1987 | Fed. Rep. of Germany . |
| 0113832 | 6/1985 | Japan .............................. 267/140.1 |

Primary Examiner—Andres Kashnikow
Assistant Examiner—Matthew C. Graham
Attorney, Agent, or Firm—Nils H. Ljungman

[57] ABSTRACT

This invention relates to a hydraulically damping elastic bearing, in particular engine mounts for motor vehicles, with two fastening devices opposite one another, an elastomer resilient body between them, and a controllable electromagnet located on one fastening device, consisting of coil and armature, with which a magnetically active element can interact to change the suspension characteristic of the elastic bearing. To achieve a variable, dynamic damping by way of an electrical control, with simultaneous hydraulic action, the interior of the elastic bearing is divided into two chambers filled with damping fluid. The chambers are connected with one another by means of at least one throttle, whereby the coil and the axially movable armature of the electromagnet are designed partly as the partition between the chambers.

18 Claims, 8 Drawing Sheets

HYDRAULICALLY DAMPING ELASTIC BEARING

BACKGROUND OF THE INVENTION

1. Field of the Invention

This invention relates to a hydraulically damping elastic bearing, in particular engine mounts for motor vehicles, with two fastening devices opposite one another, an elastomer resilient body between them, and a controllable electromagnet located on one fastening device, consisting of coil and armature, with which a magnetically active element can interact to change the suspension characteristic of the elastic bearing.

Such elastic bearings are used to mount drive aggregates in motor vehicles of all types. In mountings for internal combustion engines in motor vehicles, the softest possible suspension with a low characteristic damping is necessary on one hand to eliminate the transmission of noise, but then the motor movements excited by the roadway become very large and decay almost undamped. On the other hand, the large motor movements can be reduced by hard mountings or separate Stucker dampers (Struckerdämpfer), but that again leads to considerable transmission of noise to the body.

2. Description of the Prior Art

The prior art includes elastic bearings of this type (e.g. DE-OS 34 31 117), in which an elastic bearing works together with an elastomer resilient body placed between bearing mounts, and a controllable magnet located on the one bearing mount. The controllable magnet, together with a magnetically active element, thereby changes the resilience characteristic of the bearing. Another magnetic force can thereby be superimposed on the force acting in the elastic body, so that the resulting force in the elastic body will be different from that between the bearing mounts, which corresponds to a modified resilience.

OBJECT OF THE INVENTION

The object of the invention is an elastic bearing which provides a variable, dynamic damping by means of an electrical control and simultaneous hydraulic action.

SUMMARY OF THE INVENTION

This object is achieved by the invention, in that the interior of the elastic bearing is divided into two chambers filled with damping fluid, which are connected to one another by means of at least one throttle, whereby the coil and the axially movable armature of the electromagnet are designed partly as a partition between the chambers.

In this embodiment it is advantageous if damping can be externally regulated by means of the electromagnet, so that dynamic vibrations can be variably damped by means of the magnet armature, by regulating the electromagnetic field. Transverse forces which occur are damped by an elastomer resilient body. The damping medium is also throttled by means of the throttle.

It is also possible, by means of a controlled compensation of the force introduced, to achieve a so-called absorber mount without further modification of the internal structure, whereby only the external activation needs to be modified. A combination of engine mount and absorber mount is also possible from a control point of view. Higher-frequency vibrations can be very greatly damped by superimposing a frequency-controlled alternating current voltage on the direct current voltage.

Another essential characteristic is that the armature of the electromagnet is firmly connected to the fastener apparatus located opposite the coil. The introduction of force to the elastic bearing takes place by means of the fastener apparatus, to which the armature is directly attached. The position of the armature is influenced by the coil of the electromagnet, and the forces introduced can be compensated directly by the electromagnet directly without previous fixed elastic damping. Such a regulation system is characterized by a rapid response. Only thrust and transverse forces are absorbed by the elastomer resilient body.

For additional action on the throttle in the partition, the axially movable armature is provided with a closing part, which closes the throttle in one limit position of the armature.

In one configuration of the invention, the armature has at least one hole, which, with the interposition of a valve, forms a bypass between the two chambers.

In certain applications, a change of the cross section of the throttle is undesirable, if the necessary damping values are to be achieved. For this purpose, another important embodiment provides that the throttle is a passage running in a circular or spiral fashion around the bearing axis, which is divided in the direction of the bearing axis, whereby one half of the passage is located in a fixed component and the corresponding other half is located in the axially movable armature.

Conversely, the armature of the electromagnet surrounds the coil coaxially in another favorable configuration of the invention.

One aspect of the invention resides broadly in a hydraulically damping elastic motor mount bearing for a motor vehicle, the bearing including: a body having first end arrangements for fastening the bearing to a first structure and a second end arrangement for fastening the bearing to a second structure; elastomeric arrangement joining the first end arrangement and the second end arrangement; the elastomeric arrangement also forming a cavity within the body: a partition dividing the cavity into two chambers with damping fluid being contained therein; throttle arrangement connecting the first and second chamber: and a controllable electromagnet, which includes an arrangement for changing at least one suspension characteristic of the bearing. The controllable electromagnet forms at least part of the partition means.

BRIEF DESCRIPTION OF THE DRAWINGS

Preferred embodiments of the invention are explained in greater detail in the accompanying figures.

DESCRIPTION OF THE PREFERRED EMBODIMENTS

Figure 1:
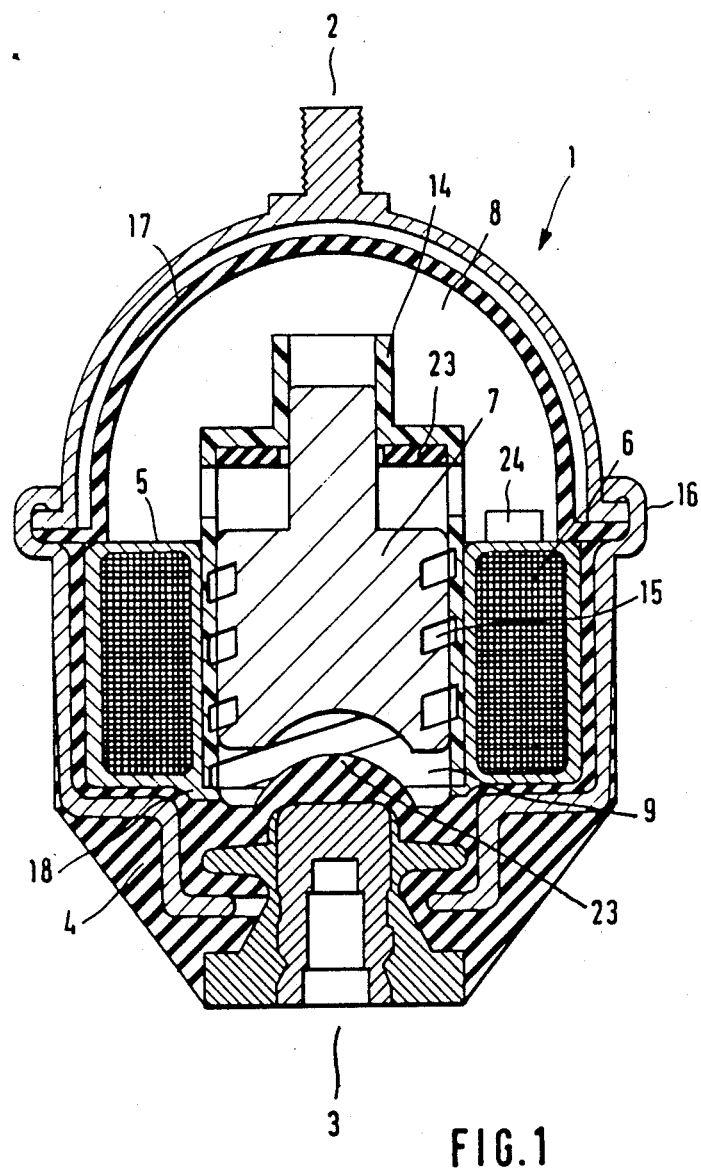
FIG. 1 is an axial longitudinal section of an elastic bearing.

The elastic bearing 1 in FIG. 1 has two fastening devices 2 and 3 opposite one another in the axial direction. Between the fastening apparatus 3 and the housing 16, an elastomer resilient body is attached by vulcanization. In the housing 16 there is an electromagnet 5, consisting of coil 6 and armature 7. The electromagnet 5 divides the inside of the engine mount 1 into an upper chamber 8 and a lower chamber 9. The chambers 8 and 9 are connected to one another by means of a passage 15 and are filled with damping fluid. The passage 15 thereby corresponds to the throttle 10 in some of the alternative embodiments of the invention shown in some of the other figures. When motor vehicle engine vibrations are introduced by means of the fastening device 2, the armature 7 is moved axially and displaces damping fluid out of the one chamber, via the passage 15, and into the other chamber. During the axial movement of the armature 7, the cross section of the passage 15 changes, and can also be regulated in the desired manner by activating the electromagnet.

In the vicinity of the fastening device 3, the housing 16 is supported in the manner of a bayonet seal by means of the elastomer resilient body 4, so that if and when the elastomer resilient body 4 disintegrates, the bearing parts will be held together so that they cannot easily fall out.

Figure 2:
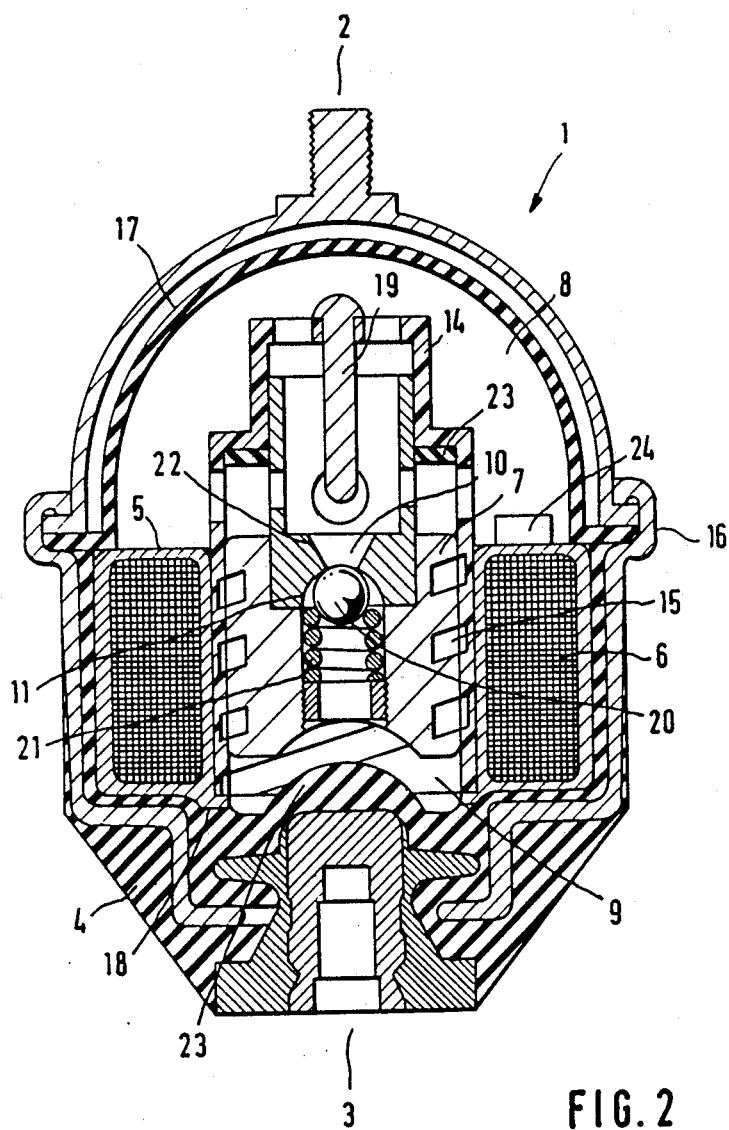
FIGS. 2, 3, 4, 5, 6, 7, and 8 illustrate other variants of an elastic bearing, the principle of which is similar to that shown in FIG. 1.

FIG. 2 shows another embodiment of an elastic bearing 1, in which there is a decoupled introduction of force. The fastener device 3 is used to support the elastic bearing, whereby the force is introduced via the housing 16. By means of the axial displacement of the elastomer resilient body 4, the damping is changed. The hydraulic damping can also be achieved by changing the volume of the chambers 8 and 9. The damping fluid travels from the one chamber, again via the passage 15, into the chamber located opposite. The electromagnet 5, by means of the coil 6, thereby controls the armature 7, and thus the cross section of the passage 15. In the upper housing portion 16a there is a rubber bellows 17 to seal off the upper chamber 8.

Figure 3:
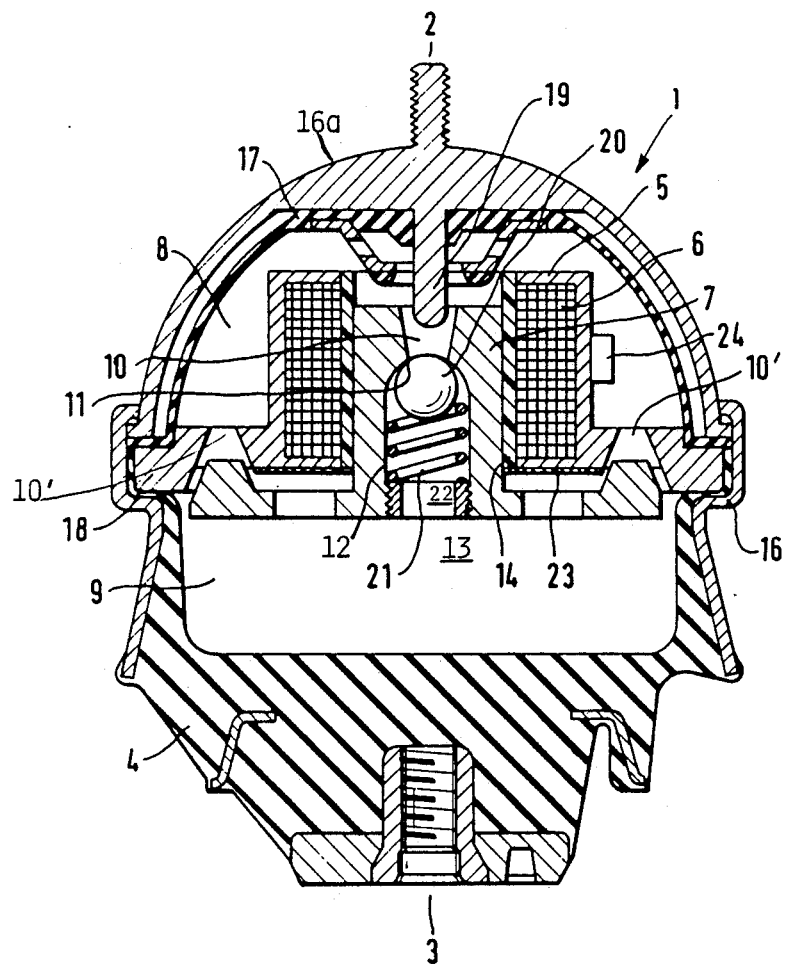

The embodiment of an elastic bearing 1 illustrated in FIG. 3 has a lower fastening device 3 and an upper fastening device 2. The cavity formed between the elastomer resilient body 4 and the upper housing portion 16a is divided by the electromagnet 5 and the partition 18 into an upper chamber 8 and a lower chamber 9. Inside the coil 6 of the electromagnet 5 there is an armature 7, whose end toward the lower chamber 9 has a closing part 11. The closing part 11 works together with the throttle 10, whereby in the upper position of the armature 7, the throttle 10 is closed by the closing part 11. In this position, the valve 13 is active, in that the pin 19 of the upper housing part 16a pushes the closing ball 20 toward the spring 21 in the bypass 22. The bypass 22 is formed by the hole 12 of the armature 7. The bypass 22, when the throttle 10 is closed, prevents an undesirable overpressure in the upper, rigid chamber 8. In this embodiment, too, there is a decoupled introduction of force via the housing 16, whereby the electromagnet 5 is used to control the throttle 10.

Figure 4:
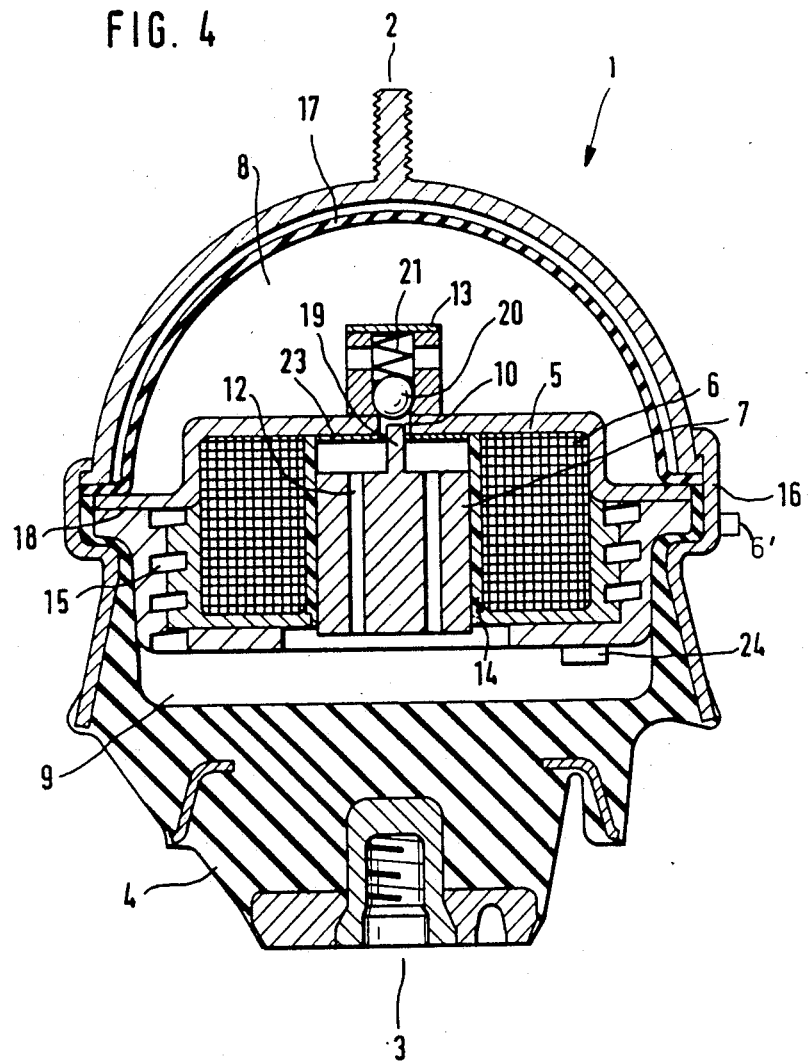
Figure 6:
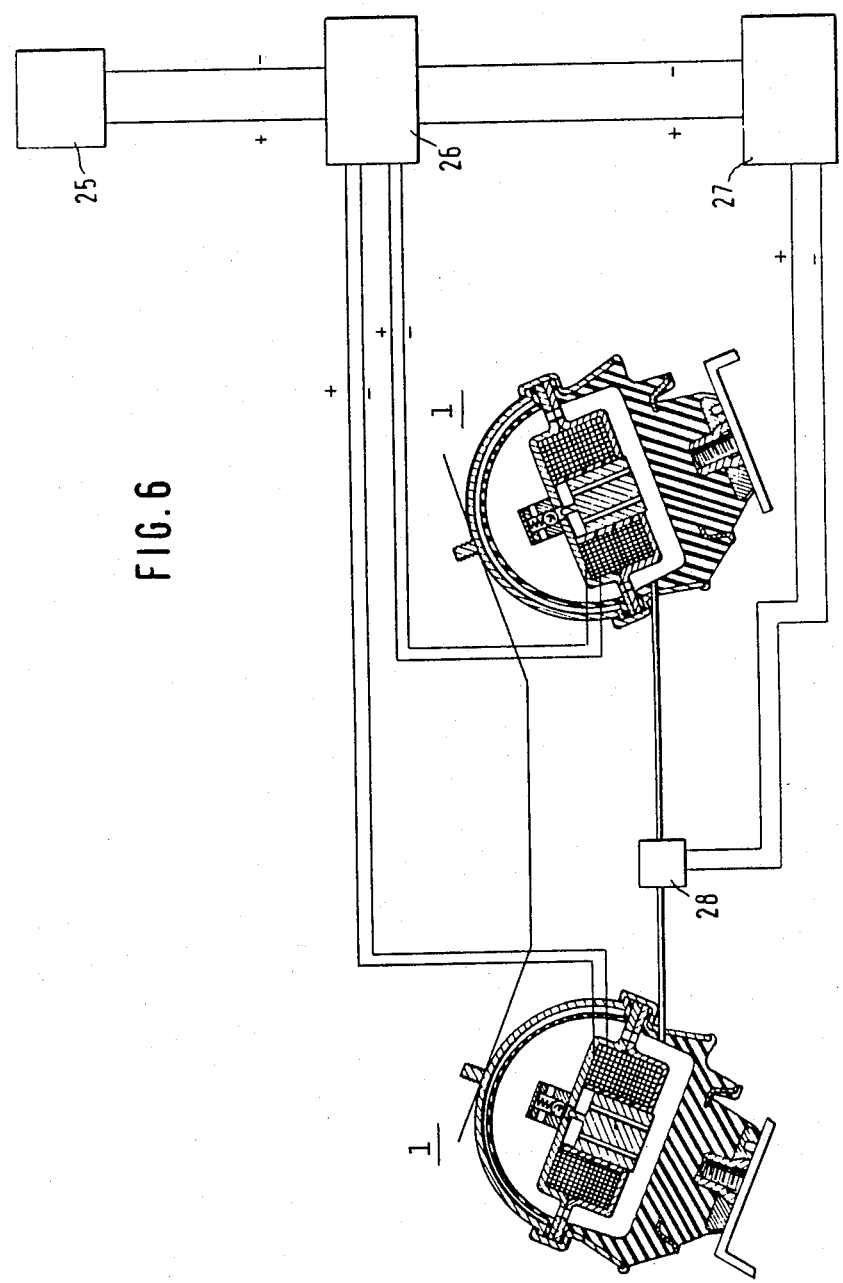

FIG. 4 shows an elastic bearing 1, in which the upper fastening part 2 is connected directly with the coil 6 of the electromagnet 5. The coil is thereby located in the center of the bearing axis 14, whereby the armature 7 is located coaxially outside the coil 6, and the damping channel 15 is formed half by the coil 7 and half by the inner wall of the housing 16. The damping fluid travels back and forth from the upper chamber 8 to the lower chamber 9 via the passage 15. By means of an introduction of force via the fastening device 2, the coil 6 is moved axially, and the damping medium travels via the passage 15 from one chamber into the other. To have the appropriate length, the passage 15 runs in a spiral fashion around the circumference of the armature. The coil is connected to a preferably bifilar connector 6' to be connected to an electronic regulation system with an amplifier as shown in FIG. 6. Similar connection arrangements are made in the other embodiments.

Figure 5:
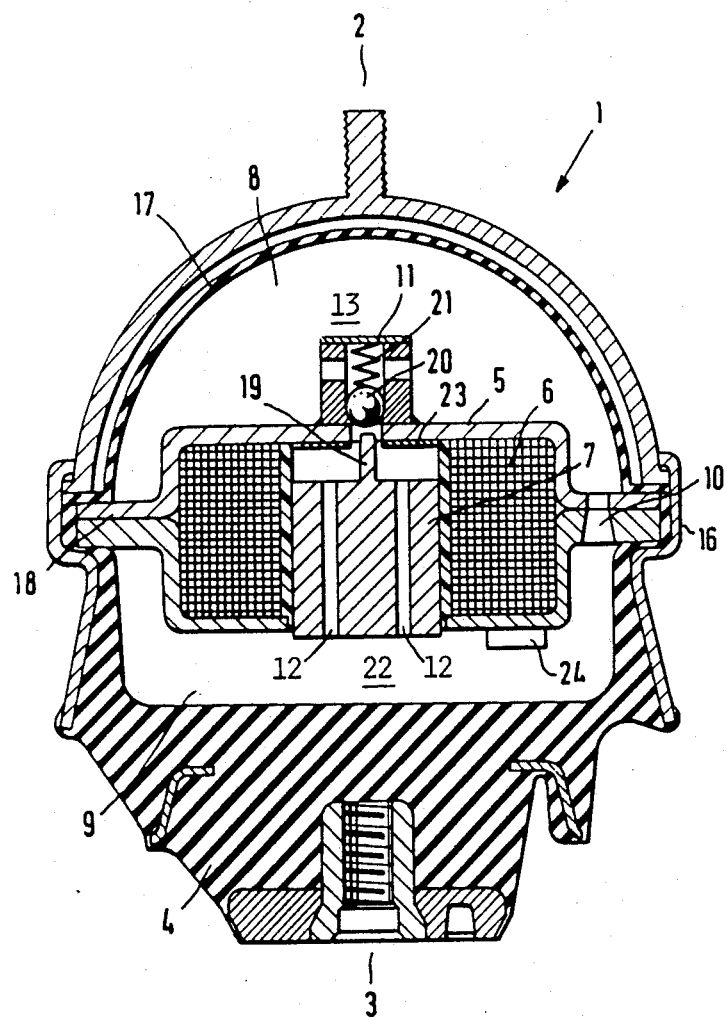

FIG. 5 shows an elastic bearing 1, in which the partition 18, together with the electromagnet 5, divides the inside of the elastic bearing 1 into the upper chamber 8 and the lower chamber 9. The partition 18 has constant throttles 10' distributed over the circumference. The armature 7 of the electromagnet 5 is equipped with holes 12, which form a bypass 22 together with the valve 13. A pressure measurement probe 24 is placed in the chamber 9 to measure the pressure therein.

FIG. 6 shows an arrangement of two substantially similar elastic bearings both of which are designated 1, which are controlled by means of a battery 25, an electronic regulation system 26, an amplifier 27 and a differential pressure sensor 28. An example of a pressure sensor or transductor is found in U.S. Pat. No. 3,965,746 entitled "Pressure Transducer".

Figure 7:
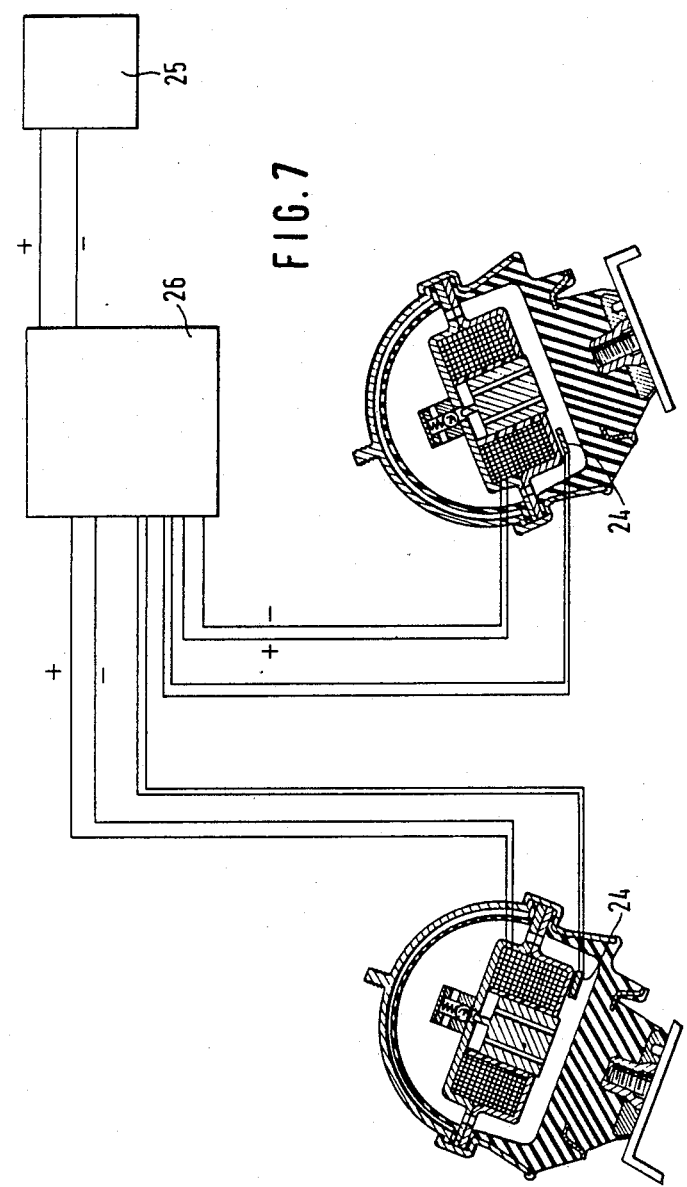

In contrast, the elastic bearing 1 in FIG. 7 is controlled only by means of a battery 25 and an electronic regulation system 26, whereby pressure measurement probes 24 in each of the lower chambers 9 give corresponding control signals to the electronic regulation system 26. The electronic regulation system 26 is preferably an EPROM controlled system. Some examples of EPROM's are found in U.S. Pat. No. 4,720,816, entitled "Programming Of An EPROM": and U.S. Pat. No. 4,718,037, entitled "Microcomputer Containing EPROM With A Self-Program Capability"; and U.S. Pat. No. 4,713,792, entitled "Programmable Macrocell Using Eprom Or Eeprom Transistors For Architecture Control In Programmable Logic Circuits"; and U.S. Pat. No. 4,685,084, entitled "Apparatus For Selecting Alternate Addressing Mode And Read-Only Memory". All of the above-mentioned patents are incorporated herein by reference as if the texts thereof were fully set forth herein.

Figure 8:
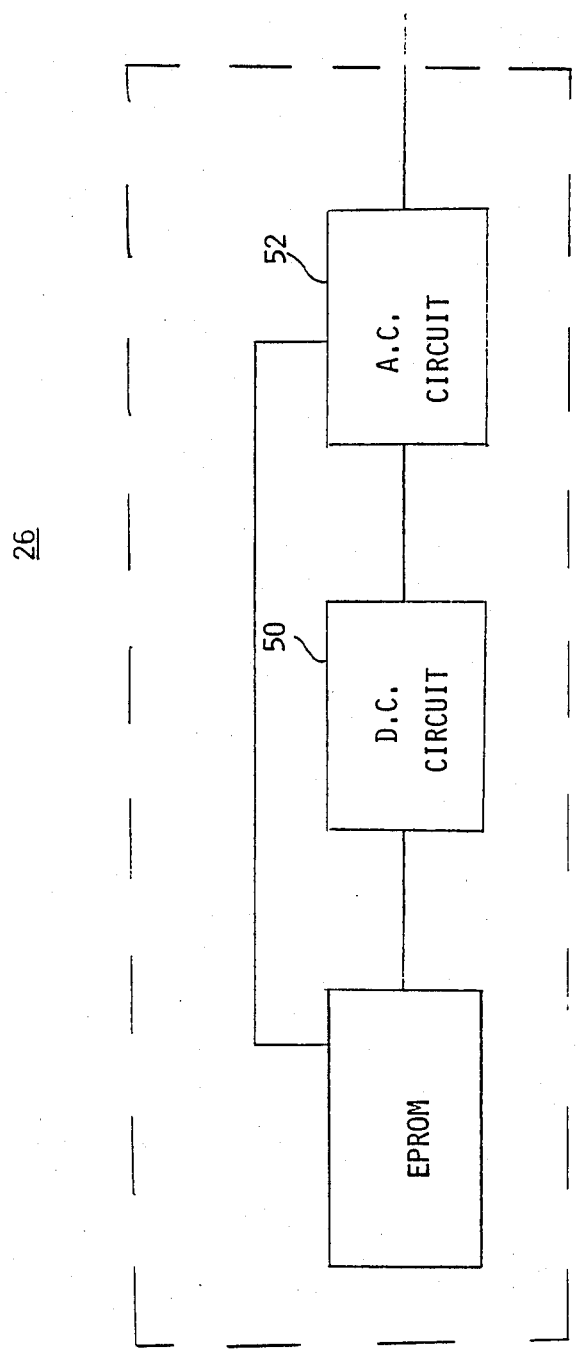

FIG. 8 shows an alternative embodiment of the electronic regulation system with a direct current circuit 50 and a frequency controlled alternating current source controlled circuit 52 both connected to an EPROM.

In summing up, an embodiment of the invention resides in a hydraulically damping elastic bearing, in particular engine mounts for motor vehicles, which include two fastening devices opposite one another, an elastomer resilient body between them, and a controllable electromagnet located on one fastening device, consisting of coil and armature, with which a magnetically active element can interact to change the suspension characteristic of the elastic bearing. The interior of the elastic bearing 1 is divided into two chambers 8 and 9, filled with damping fluid. These two chambers are connected to one another by means of at least one throttle 10, 15, whereby the coil 6 and the axially movable armature 7 of the electromagnet 5 are designed partly as a partition between the chambers.

Another aspect of the invention resides in an elastic bearing in which the armature 7 of the electromagnet 5 is firmly connected to the fastening apparatus 2 located opposite the coil 6.

Yet another aspect of the invention resides in an elastic bearing in which the axially movable armature 7 has a closing part 11 which closes the throttle 10 in one limit position of the armature 7.

Still another aspect of the invention resides in an elastic bearing in which the armature 7 has at least one hole 12, which, with the interposition of a valve 13, forms a bypass between the two chambers 8, 9.

Yet still another aspect of the invention resides in an elastic bearing in which the throttle 10 is a passage 15 running in a circular or spiral fashion around the bearing axis 14. This passage is divided in the direction of the bearing axis 14, whereby one half 15a of the passage 15 is located in a fixed component, and the corresponding other half 15b is located in the axially movable armature 7.

A further aspect of the invention resides in an elastic bearing in which the armature 7 of the electromagnet 5 coaxially surrounds the coil 6.

The invention as described in the context of a preferred embodiment is not to be taken as limited to all of the provided details thereof, since modifications and variations thereof may be made without departing from the spirit and scope of the invention.

What is claimed is:

1. Hydraulically damping elastic motor mount bearing for a motor vehicle, said bearing comprising:
    a body having first end means for fastening said bearing to a first structure and a second end means for fastening said bearing to a second structure;
    elastomeric means joining said first end means and said second end means;
    said elastomeric means also forming cavity means within said body;
    partition means dividing said cavity means into two chambers;
    damping fluid being contained in said two chambers;
    throttle means connecting said first and second chamber, said throttle means comprising a helical passage; and
    controllable electromagnetic means for varying a helical portion of said helical passage and thus for changing at least one suspension characteristic of said bearing, said controllable electromagnetic means being disposed to form at least a part of said partition means.

2. Hydraulically damping elastic motor mount bearing according to claim 1, wherein said partition means is attached to one of said end means.

3. Hydraulically damping elastic motor mount bearing according to claim 1, wherein said controllable electromagnetic means is disposed to alter at least one dimension of said throttle means.

4. Hydraulically damping elastic motor mount bearing according to claim 1, wherein said controllable electromagnetic means comprises coil means and armature means, said coil means being attached to be firmly supported by one of said end means.

5. Hydraulically damping elastic motor mount bearing according to claim 4, wherein said bearing has a longitudinal axis and said controllable electromagnetic means has a longitudinal axis, said longitudinal axis of said controllable electromagnetic means and said bearing being substantially collinear.

6. Hydraulically damping elastic motor mount bearing according to claim 5, wherein said armature means has a longitudinal axis being substantially collinear with said longitudinal axis of said bearing.

7. Hydraulically damping elastic motor mount bearing according to claim 1, wherein said controllable electromagnetic means is connected to control at least a portion of said throttle means.

8. Hydraulically damping elastic motor mount bearing according to claim 1, wherein said controllable electromagnetic means comprises coil means and armature means.

9. Hydraulically damping elastic motor mount bearing according to claim 8, wherein said armature means has a portion for closing at least one throttle passage of said throttle means.

10. Hydraulically damping elastic motor mount bearing according to claim 8, wherein said coil means at least partially surrounds said armature means.

11. Hydraulically damping elastic motor mount bearing according to claim 8, wherein said armature means has at least one passage extending through said armature means for forming a bypass between said two chambers.

12. Hydraulically damping elastic motor mount bearing according to claim 11, including valve means disposed in said at least one passage.

13. Hydraulically damping elastic motor mount bearing according to claim 1, wherein said controllable electromagnetic means comprises coil means and armature means, said coil means being attached to said partition means.

14. Hydraulically damping elastic motor mount bearing according to claim 1, wherein said controllable electromagnetic means comprises coil means and armature means and said coil means at least partially surrounds said armature means.

15. Hydraulically dampimg elastic motor mount bearing for a motor vehicle, said bearing comprising:
    a body having first end means for fastening said bearing to a first structure and a second end means for fastening said bearing to a second structure;
    elastomeric means joining said first end means and said second end means;
    said elastomeric means also forming cavity means within said body;
    partition means dividing said cavity means into two chambers;
    damping fluid being contained in said two chambers;
    throttle means connecting said first and second chamber;
    controllable electromagnetic means for changing at least one suspension characteristic of said bearing, said controllable electromagnetic means being disposed to form at least a part of said partition means and comprising coil means and armature means, said armature means having at least one passage extending through said armature means for forming a bypass between said two chambers;
    valve means disposed in said at least one passage; and
    mechanical means disposed at one of said end means for mechanically opening said valve means.

16. Hydraulically damping elastic motor mount bearing according to claim 15, wherein said throttle means comprises a helical passage, a first portion of said passage being disposed in said armature means, and a second portion of said passage being disposed in said coil means;
    said armature being movably disposed in said coil to alter at least one dimension of said passage.

17. Hydraulically damping elastic motor mount bearing for a motor vehicle, said bearing comprising:
    a body having first end means for fastening said bearing to a first structure and second end means for fastening said bearing to a second structure;
    elastomeric means joining said first end means and said second end means;

said elastomeric means also forming a cavity means within said body;

partition means dividing said cavity means into two chambers;

damping fluid being contained in said two chambers;

throttle means connecting said first and second chamber;

controllable electromagnetic means for changing at least one suspension characteristic of said bearing, said controllable electromagnetic means being disposed to form at least a part of said partition means and comprising coil means and armature means, said coil means being attached to said partition means; and said throttle means comprises a helical passage, a first portion of said passage being disposed in said armature means, and a second portion of said passage being disposed in said coil means;

said armature being movably disposed in said coil to alter at least one dimension of said passage.

18. Hydraulically damping elastic motor mount bearing according to claim 17, wherein one half of said helical passage is disposed in said armature means and the corresponding other half of said helical passage is disposed in said coil means.

* * * * *